Patented Dec. 18, 1934

1,984,793

UNITED STATES PATENT OFFICE 1,984,793

PROCESS FOR THE PRODUCTION OF IRON AND PORTLAND CEMENT IN A BLAST FURNACE

Mathias Fränkl, Augsburg, Germany, assignor to American Oxythermic Corporation, New York, N. Y., a corporation of Delaware No Drawing. Application October 14, 1931, Serial No. 568,708. In Germany November 15, 1930

6 Claims. (Cl. 75—17)

This invention relates to a process for the production of iron and Portland cement in a blast furnace, particularly to the manner in which the lime and iron ore contents are charged to the furnace and includes correlated improvements and discoveries whereby such production is enhanced.

It is well known that the smelting of iron ores in a blast furnace involves the utilization of limestone as a flux. It might seem, therefore, that the production of Portland cement and pig iron simultaneously in a blast furnace could be easily accomplished by simply adding an appropriate quantity of limestone to the charge and enriching the air blast with oxygen. There, however, are obstacles to effecting the production of Portland cement in a blast furnace. Thus, the charging of limestone to the furnace in lump form, along with the ore or apart therefrom, does not lend itself to a proper proportioning of the lime, silica and alumina which accompanies the iron ore and which through reaction with the lime constituent forms Portland cement.

This is due to the fact that the slag in a blast furnace varies markedly from time to time in such manner that it may at one period be decidedly more basic, and at another period less basic. These conditions are due to a greater or less quantity of lime undergoing melting at a given period of time, which in turn is occasioned by an uneven descent of the charge in the furnace. The irregular working of a blast furnace causes a greater or less amount of lime to react and enter the slag since the limestone usually employed has a melting point higher than that of the ore, and hence at times a smaller amount of lime is melted than ore.

It is the principal object of this invention to provide a process in accordance with which Portland cement may be produced simultaneously with pig iron in a blast furnace readily, efficiently and economically. A further object of the invention is to provide a process for producing Portland cement in a blast furnace in which the charge is so proportioned as not to interfere with the normal operations of the furnace and to insure reaction between the proper quantities of lime material and silica or alumina, for example, in the ore to produce a good grade of Portland cement.

An additional object of the invention is to provide a process for the production of Portland cement in a blast furnace in which the materials entering into the charge, such as limestone, iron ore and a reducing agent, as coke, are first admixed in the desired proportions and then briquetted.

Other objects of the invention will in part be obvious and will in part appear hereinafter.

The invention accordingly comprises the several steps and the relation of one or more of such steps with respect to each of the others thereof, which will be exemplified in the process hereinafter disclosed and the scope of the invention will be indicated in the claims.

In the practice of the invention, a charge for a blast furnace may be prepared by taking a lime material such as limestone or burnt lime, that is CaO, in suitable form, as, for example, in a crushed or more or less finely divided form, and admixing it with iron ore which contains in the gangue material alumina and silicates usually found in such ore. The admixture is proportioned in the quantities desired to form during the operation of the blast furnace a slag which when ground constitutes a Portland cement. The lime material and the iron ore after admixture are compressed into briquette form and are charged to a blast furnace as so briquetted. Furthermore, if desired, the reducing agent, such as carbon, for example coke, may be incorporated with the lime material, iron ore admixture and the whole formed into briquettes. The briquettes formed in this manner may then be charged into a blast furnace and the operation thereof conducted in the usual manner.

The smelting process will yield a pig iron and a slag in which the lime and silica and alumina contents are in the proportions required for Portland cement. It has hereinbefore been pointed out that the melting point of limestone is higher than the melting point of iron ore, so that if the blast furnace operation is irregular, as frequently happens, there will result a less melting of lime with respect to the iron ore. The briquetting of the limestone with the iron ore or with the iron ore and reducing agent, according to this invention, gives an admixture having a melting or fusing point considerably below that of either limestone or burnt lime. The reactive constituents accordingly readily undergo reaction to form a Portland cement and such reaction occurs without a melting of the admixture, that is, by a sintering of the mass such as takes place in the production of Portland cement in a rotary kiln.

The procedure of the invention through the briquetting of the iron ore and the lime material brings these materials into intimate contact, so that a separate melting of limestone and of iron ore does not take place and brings the ore and lime into reaction in such proportions that variations in the constitution of the slag formed and from which the Portland cement is produced, do not occur. It will be understood that the briquettes may be formed either by the simple effect of compression, the lime material acting as a binding agent or with the use of a binding material other than the lime.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process for the production of Portland cement and pig iron in a blast furnace, which comprises admixing a lime material and iron ore proportioned in the quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

2. A process for the production of Portland cement and pig iron in a blast furnace, which comprises admixing lime material, an iron ore and a reducing agent proportioned in the quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

3. A process for the production of Portland cement and pig iron in a blast furnace, which comprises admixing limestone and an iron ore in finely divided condition proportioned in the quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

4. A process for the production of Portland cement and pig iron in a blast furnace, which comprises admixing limestone, an iron ore and coke, in the proportioned quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

5. A process for the production of Portland cement and pig iron in a blast furnace, which comprises admixing limestone, an iron ore, coke, and a binder in a finely divided condition proportioned in the quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

6. A process for the production of Portland cement and pig iron in a blast furnace, which comprises admixing burnt lime and iron ore proportioned in the quantities required to yield during furnacing a slag having a uniform composition of a Portland cement, forming the admixture thus obtained into briquettes, charging the said briquettes into a blast furnace, sintering the briquetted mass in said furnace with the production of Portland cement through heating thereof by means of an air blast enriched in oxygen, and then melting the mass through continued heating whereby the formed Portland cement separates from the iron as a slag.

MATHIAS FRÄNKL.